Patented Nov. 24, 1925.

1,563,061

UNITED STATES PATENT OFFICE.

EMILE L. BALDESCHWIELER, OF NEW YORK, N. Y., ASSIGNOR TO STANDARD DEVELOPMENT COMPANY, A CORPORATION OF DELAWARE.

OBTAINING VANADIUM VALUES, ETC.

No Drawing.    Application filed August 4, 1923.    Serial No. 655,746.

*To all whom it may concern:*

Be it known that I, EMILE L. BALDESCHWIELER, a citizen of the United States, residing at New York, in the county of New York and State of New York, have invented new and useful Improvements in Obtaining Vanadium Values, Etc., of which the following is a specification.

This invention relates to the art of obtaining vanadium, etc., and will be fully understood from the following description.

Some petroleums, for example, Mexican petroleum, contain appreciable amounts of vanadium, molybdenum, etc. When such oils are burned, as is customary in oil-burning furnaces for boilers, etc., an ashy residue settles in the combustion chamber and flues. This constitutes in effect a high-grade concentrate which can be treated in a suitable manner for recovering the values contained.

Of the known processes for treating vanadium-containing materials, the acid processes are disadvantageous in necessitating expensive apparatus and yielding uncertain precipitations, besides being very wasteful of many of the agents used, particularly ammonium chlorid; the roasting processes also are disadvantageous by reason of the difficulties encountered in roasting.

In accordance with the present invention disadvantages of such character are avoided, and the treatment proceeds as follows: The finely divided material is subjected to the action of an alkali solution, preferably a caustic soda solution of 5–30%; for best results this solution will be of considerable strength, for instance, about 20%, and while it may be used by percolation at ordinary temperature, it is desirable that the temperature be raised, preferably digestion being carried on with the solution heated to boiling. By prolonging this operation for several hours the vanadium, molybdenum, etc. are quite completely dissolved out. The solution is filtered off, most advantageously while hot, and is made just acid, with sulfuric acid for instance, and is allowed to stand for a time. It is convenient in practice to let the solution stand overnight, that is about 12 hours, and if the temperature be also kept up, say near boiling, considerable water can be eliminated at the same time. The silica is now filtered off, and the solution is made just alkaline, with causic soda, and ammonium chlorid is added to about saturation. The solution is allowed to cool and stand, preferably for about 12 hours. After then decanting and filtering, the precipitate obtained is washed with a 25% cold solution of ammonium chlorid to wash out sodium salts, then once with cold water to wash out ammonium chlorid. The precipitate (which contains ammonium metavanadate $NH_4VO_3$) is dried, ground and ignited at about 500–600° F. The filtrate from the $NH_4VO_3$ precipitate will contain the molybdenum, also a small amount of vanadium. By evaporating to a smaller bulk, the crystallized ammonium salts thus collected will contain most of the remaining vanadium and can be used again. The molybdenum can then be recovered from the mother liquor if desired by acidifying and scrubbing $H_2S$ gases through the solution, thus precipitating molybdenum sulfid. The latter may then be roasted to molybdic acid.

The residue from the initial caustic soda treatment should contain very little vanadium and a second treatment with fresh caustic solution should remove it all. This residue contains all the nickel and if desired, can be worked up for its recovery.

Although I have described my invention with reference to the treatment of petroleum ash, it will be understood that ores and concentrates can also be treated.

I claim:

1. The improvement in the art of obtaining vanadium, etc. which comprises heating finely divided ashy residue of petroleum to boiling with about a 20% solution of caustic soda for several hours, separating the solution and the residue while hot, rendering the solution just acid with sulfuric acid, allowing the solution to stand for about 12 hours at a high temperature, filtering out the silica, making the solution just alkaline with caustic soda, adding ammonium chlorid to the solution until substantially saturated, allowing the solution to cool and stand about 12 hours, separating the precipitate and the liquid and recovering vanadium etc. from said separated portions.

2. The improvement in the art of obtaining vanadium, which comprises heating petroleum ash to boiling with about a 20% solution of caustic soda for several hours, separating the solution and the residue while hot, rendering the solution just acid with sulfuric acid, allowing the solution to stand for about 12 hours at a high temperature, filtering out the silica, making the solution just alkaline with caustic soda, adding ammonium chlorid to the solution until substantially saturated, allowing the solution to cool and stand about 12 hours, separating the precipitate, washing the precipitate, with a cold ammonium chloride solution, then with cold water, drying and grinding the precipitate, and igniting at 500°–600° F.

3. The improvement in the art of obtaining vanadium, which comprises digesting petroleum ash with a strong caustic soda solution, separating the solution and the residue, acidulating the solution, allowing the solution to stand to settle silica, filtering out the silica, making the solution alkaline, adding ammonium chloride to substantial saturation, allowing the solution to stand, separating the precipitate, washing the precipitate and drying and igniting.

4. The improvement in the art of obtaining vanadium, etc., which comprises digesting vanadium-containing material with a caustic soda solution, separating the solution and the residue, acidulating the solution, separating out silica, making the solution alkaline, adding ammonium chlorid, separating the precipitate formed and the liquid and recovering vanadium, etc. from said separated portions.

5. The improvement in the art of obtaining vanadium, which comprises treating vanadium-containing material with a caustic soda solution, separating the solution and the residue, acidulating the solution, separating out silica, rendering the solution alkaline, adding ammonium chlorid, and separating the precipitate formed.

6. The improvement in the art of obtaining vanadium, etc., which comprises treating petroleum ash with an alkaline solvent for the desired metals, eliminating silica and recovering the vanadium and molybdenum from the solution.

7. The improvement in the art of obtaining vanadium, which comprises treating petroleum ash with an alkaline agent for removing the vanadium.

EMILE L. BALDESCHWIELER.